United States Patent
Costas (10) Patent No.: US 6,560,510 B1
(45) Date of Patent: May 6, 2003

(54) SIMULTANEOUS AUTO-LOADING TOWER

(76) Inventor: Dan N. Costas, 3131 Hawkeye Ave., Turlock, CA (US) 95380

( * ) Notice: Subject to any disclaimer, the term of this patent is extended or adjusted under 35 U.S.C. 154(b) by 0 days.

(21) Appl. No.: 09/847,880

(22) Filed: May 2, 2001

(51) Int. Cl.⁷ .................................................. G06F 7/00
(52) U.S. Cl. ............. 700/218; 414/222.09; 414/222.13; 414/226.05; 369/30; 369/36; 369/178; 369/192
(58) Field of Search ................................ 700/213, 214, 700/218; 414/939, 222.01, 222.07, 222.09, 222.13, 226.05; 369/30, 30.07, 36, 191, 192, 196, 178, 202

(56) References Cited

U.S. PATENT DOCUMENTS 5,612,934 A * 3/1997 Dang et al. .................... 360/92
5,793,717 A * 8/1998 Morita et al. ............ 369/30.32

* cited by examiner

*Primary Examiner*—Khoi H Tran
(74) *Attorney, Agent, or Firm*—Charles L. Thoeming (57) ABSTRACT

An apparatus and method for the efficient simultaneous loading and unloading a plurality of compact disc media into and out of a plurality of recording bays. The present invention provides a plurality of two position platters that allow the simultaneous rotation of a plurality of compact discs along horizontal planes defined by the platters above compact disc drive input trays for the transfer of the compact discs to a plurality of compact disc drives using a plurality of associated compact disc lifting devices that lift the compact discs off the platters allowing the platters to rotate along a central axis and then distributes the plurality of compact discs into the compact disc trays. One platter is used for each compact disc recording or writing drive. Loading and unloading of each disc platter is sequentially performed by pick and place systems while the compact disc writer drives are operating, thus eliminating delays in sequential loading and unloading while maximizing recording time per disc recording or writer drive.

15 Claims, 9 Drawing Sheets fig. 1 fig. 2 fig. 3 fig. 4 fig. 5 fig. 6

SIMULTANEOUS AUTO-LOADING TOWER

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

BACKGROUND OF THE INVENTION

Field of the Invention

This invention relates to a method and apparatus for simultaneous automated loading and unloading of a plurality of disc handling machines, such as disc drives or compact disc recording ("CDR") units, for the repetitive mass recording of compact discs, digital video discs, or other similar media. The present invention incorporates as part of a rotatable disc delivery component my previous invention, U.S. Pat. No. 5,873,692, for picking a single compact disc from a stack of blank compact discs and loading the selected disc into a predetermined platter bay. The rotatable disc delivery component also functions to pick a single recorded compact dick from a predetermined platter bay and depositing the recorded disc into a recorded disc module.

Existing equipment for loading and unloading disc handling machines is unnecessarily time consuming with considerable unutilized machine downtime as a result of these inefficiencies, and it remains desirable to find a low-cost, simple solution to this problem.

Present volume copying onto digital compact discs presents significant inefficiencies in disc drive utilization. Loading and unloading multiple disc drives or CDR units using existing methods and apparatus results in drive down-time while the automated loading devices empty and load each individual drive or CDR unit in succession. For multiple drive or CDR unit systems, this downtime can be as much as three to ten minutes, depending upon the mechanism and drive or CDR unit loading geometry employed by the system. Over the course of recording one thousand discs, this underutilization of recording drives or CDR units can limit the productivity and usefulness of the system from approximately three to eight hours.

The existing methods and apparatus also present delays and inefficiencies in handling recorded disc output, labeling and segregation.

BRIEF SUMMARY OF THE INVENTION

In accordance with the invention claimed, one embodiment of a method and apparatus for automated simultaneous loading and unloading multiple disc drives during bulk recording operations of digital compact discs is provided in a novel construction and procedure that overcomes the deficiencies and limitations of prior art.

It is, therefore, one object of this invention to provide an improved apparatus and method for concurrent copying of recordable digital compact discs.

A further object of the present invention is to provide such an improved apparatus and method for simultaneous automated loading of a plurality of disc handling machines.

Another object of this invention is to provide such an improved apparatus and method for automated simultaneous loading of multiple disc recording devices or CDR units.

It is yet another object of this invention to provide such an improved apparatus and method for automated simultaneous unloading of multiple disc recording devices or CDR units.

A further object of this invention to increase the recording drive utilization during multiple, automated bulk disc recording operations.

Still another object of this invention is to improve the blank disc and recorded disc handling and storing efficiency during multiple, automated bulk disc recording operations.

Yet another object of this invention is to provide improved spatial and functional efficiencies during multiple, automated bulk disc recording operations.

A further object of the present invention is to provide such an improved apparatus and method for simultaneous automated unloading of a plurality of disc handling machines.

A further object of the present invention is to provide an apparatus and method to minimize underutilized machine downtime for a plurality of disc handling machines during bulk disc recording routines.

A further object of the present invention is to provide an apparatus and method to improve machine efficiency for a plurality of disc handling machines during bulk disc recording routines.

A further object of the present invention is to provide an apparatus and method to eliminate tedium associated with manual or direct human supervision of bulk disc recording routines.

A further object of the present invention is to provide an apparatus and method to eliminate human error associated with manual or direct human supervision of bulk disc recording routines.

A further object of the present invention is to provide an apparatus and method to eliminate labor costs associated with manual or direct human supervision of bulk disc recording routines.

Related object and advantages of the present invention will be apparent from the following description.

Other features, advantages, and objects of the present invention will become apparent with reference to the following description and accompanying drawings.

BRIEF DESCRIPTION OF DRAWINGS

FIG. 7a–7e is a flow chart illustrating the operation of a preferred embodiment of the simultaneous automatic loading tower apparatus of the present invention.

DETAILED DESCRIPTION OF THE INVENTION

For the purposes of promoting an understanding of the principles of the present invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the present invention as illustrated therein being contemplated as would normally occur to one skilled in the art to which the invention relates.

Figure 1:
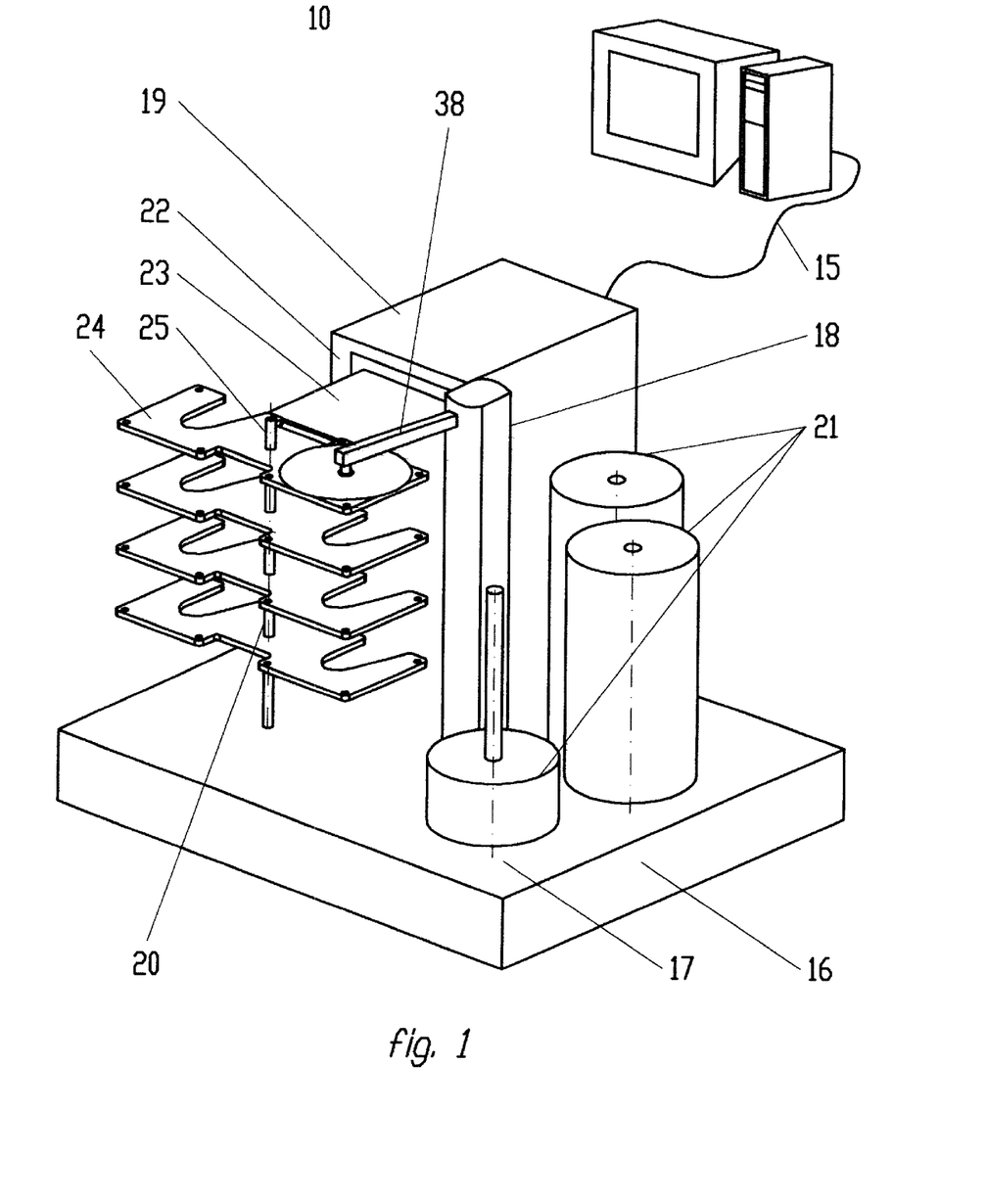
FIG. 1 is a schematic view of a portion of the simultaneous automated loading tower apparatus of this invention with a perspective view of the rotating picker assembly loading a disc into a platter bay.

Referring to FIG. 1, the simultaneous automatic loading tower of the present invention is designated generally by the reference numeral 10. The loading tower system 10 includes a host computer 15 connected to the loading tower unit 16. The host computer comprises a programmable computer that includes computer software for providing a user interface for operating the components of the loading tower system. The host computer also contains the master disc transfer unit which reads digital master data from one or more discs and then transfers the digital data to loaded disc drives or CDR units. It is to be understood that the host computer may be incorporated into the loading tower system with the loading tower system having an input device such as a keyboard or other control panel for managing the operation of the loading tower system.

The loading tower system comprises a supporting framework that has a base platform or deck 17 which has a pivotal transport tower 18, a cabinet or similar vertical housing for disc drives or CDR units 19, a rotatable vertical platter assembly 20, and a number of vertical disc stacking modules 21. The tower framework is preferably made from standard sheet metal which is formed to provide front face, top face, and support base working surfaces. Other construction for the tower framework could include high strength poly-carbon or similar unitarily formed materials which could be adapted to the same base platform materials or metal by mounting into predetermined fitted bays or slotted positions with nut and bolt attachment.

Part of the tower framework front face 22 includes openings such that the disc recording or CDR units are mounted within such openings with conventional mounting hardware, such that the doors of the disc recording or CDR units 23 open outwardly from the front face 22 of the tower framework. Thus, the tower framework provides a cabinet or vertical housing 19 for the disc recording units or drives which includes a base with disc drives or units mounted thereon. The interior volume of the cabinet or vertical housing 19 contains the compact disc writing units and related wiring connections. The cabinet base could be modified to include an integrated controller. In the preferred embodiment of the present apparatus, eight disc drives or CDR units are arranged in vertical alignment of one cabinet or vertical bay 19; however the number of recording drives or units is arbitrary and is dictated by the physical or practical aspects of the individual drives or units, the type of digital media employed, or the performance requirements over time of the entire mass disc recording specifications. It is also conceivable that the principles disclosed herein are applicable to more than one tower of drives or CDR units by providing additional cabinets or vertical bays housing disc recording drives or CDR units within the framework. In such an embodiment, the present invention and method could service at least three such cabinets, wherein each such cabinet is configured at ninety degree alignment to its adjacent cabinet and oriented around the centrally positioned drive shaft of the rotatable vertical tray assembly 20.

The aligned disc drives or CDR units are electro-mechanically controlled by the host computer or other microprocessor based controller using well known programming techniques.

Figure 2:
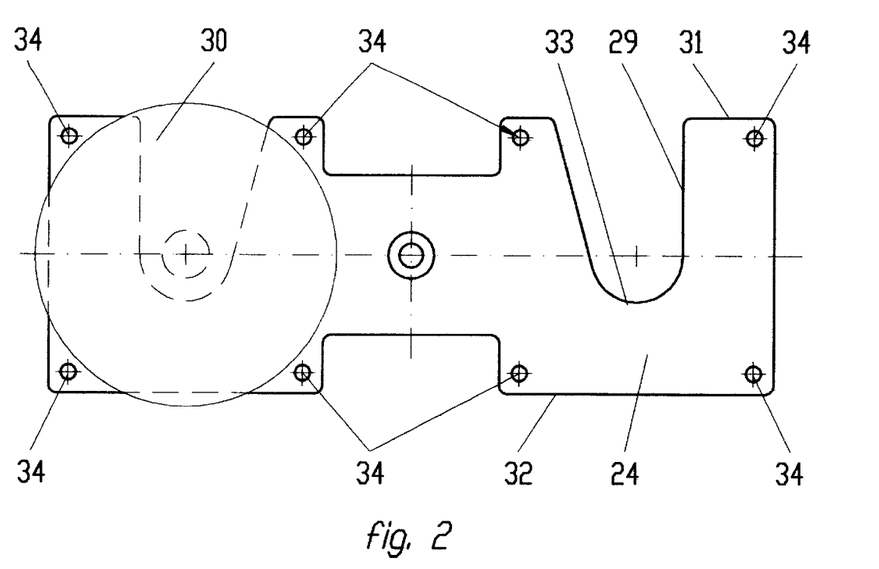
FIG. 2 is a top view of an individual platter with horizontally aligned bays and a disc loaded into one of the bays.
Figure 3:
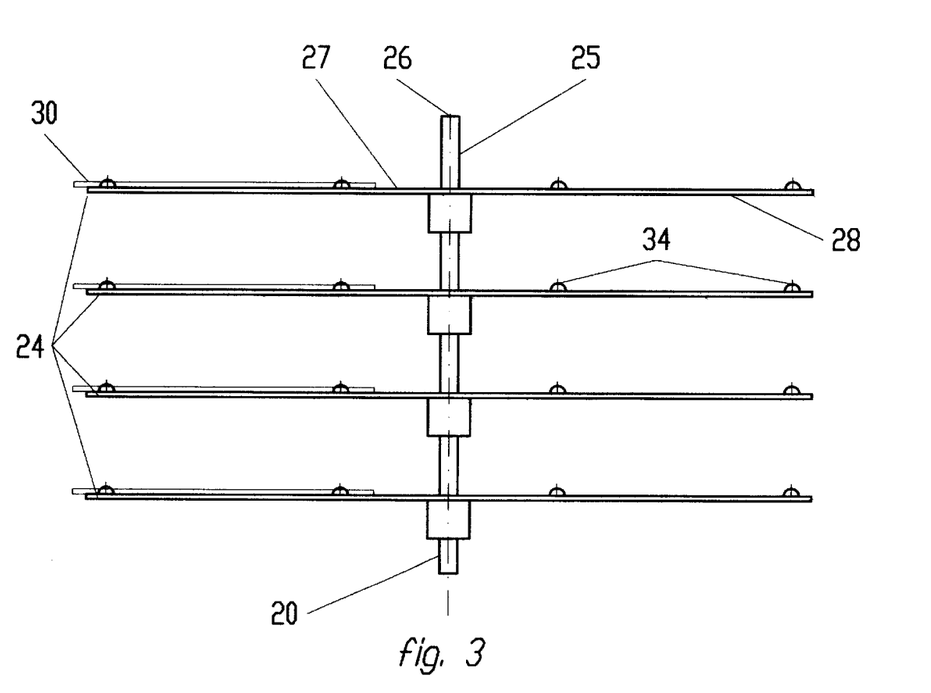
FIG. 3 is a side view of the vertical drive shaft with several platters attached and each platter having a disc in one bay.
Figure 6:
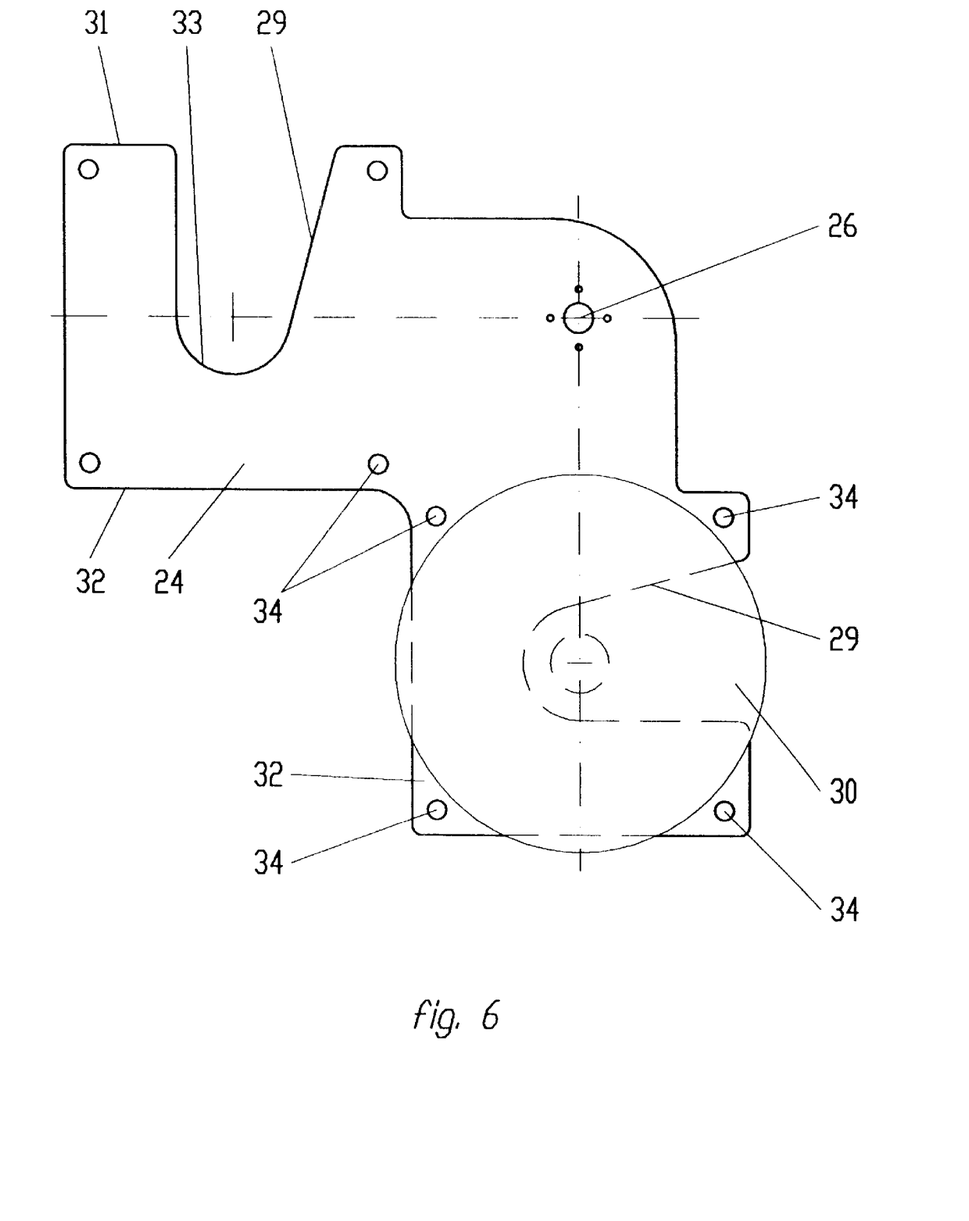
FIG. 6 is a full sized, top view of an individual platter with perpendicularly aligned bays and a disc loaded into one of the bays.

As depicted in FIGS. 2, 3 and 6, the nominal compact disc 30 with a 120 mm diameter is loaded into the platter disc bay 29. The compact disc includes a center hole, nominally 15 mm, which is defined by a radial hub which extends orthogonally from the surface of the disc approximately 0.010 inches so as to avoid stacked discs from resting on recorded disc surfaces. The disc center hole is aligned with the disc center axis. Although this embodiment of the present invention depicts the 120 mm diameter disc, the same principles would apply to discs of smaller diameters.

It is also conceivable that the principles disclosed herein could apply to any stack of flat substrates having uniform dimensions regardless of shape.

It is also conceivable that the principles disclosed herein could apply to control any variety of simultaneous disc handling operations as would be obvious to one skilled in this technology, such as labeling, archiving, jukebox, and the like.

The rotatable vertical tray assembly comprises a plurality of uniform, horizontal platters 24 perpendicularly attached to a drive shaft 25 at predetermined equal distances between each platter. As depicted in FIG. 3 each platter 24 has a central vertical axis 26, a top side 27, and a bottom side 28. Each platter has a point of attachment to the drive shaft on each platter central vertical axis. As shown in FIGS. 2, 3 and 6, each platter contains dual disc bays 29 which are equally sized and displaced from the platter cental axis to receive discs 30 from the top of the platter 27. Each platter can be constructed from durable, high impact poly-carbon material or aluminum to minimize weight and load upon the drive shaft and motor. The bays for each platter may be in a straight line, or 180 degree, alignment with each other as depicted in FIG. 2, or in a perpendicular, or 90 degree, alignment as depicted in FIG. 6. It is also conceivable that other platter bay alignment relative to each platter can be governed by the principles herein depending upon the spatial limitations and number of towers used in each system. Such platter bay alignment or configuration is dictated by space and material considerations of the relative scale of operations of the principles herein for each apparatus embodiment of the present invention.

In the preferred construction, each said disc bay comprises a front edge 31, a back edge 32, and a central core 33. Each disc bay front edge 31 is open and said central core 33 is accessible from the top and the bottom of the platter. Each platter bay top 27 has four uniform raised pegs 34 which are equidistantly oriented from each bay center point at perpendicular angles from each other and at a distance just slightly greater than the radius of the compact disc 30. In this manner, the discs are centered within each platter bay. In the preferred embodiment of the present invention, these pegs 34 are constructed from uniform extrusion of the platter material.

In the preferred embodiment, the platters 24 and drive shaft 25 are protected and separated from the exterior of the apparatus by a removable, translucent plexiglass or similarly constructed shield which rests upon and is supported by the framework base and extends vertically to a height equal to the top of the framework. Rotation of the drive shaft and horizontal movement of said platters along the vertical axis 26 of the drive shaft 25 is provided by a stepper motor and actuator attached to the bottom of the drive shaft. The action of the stepper motor is electro-mechanically controlled by the host computer or other microprocessor based controller using well known programming techniques.

Figure 4:
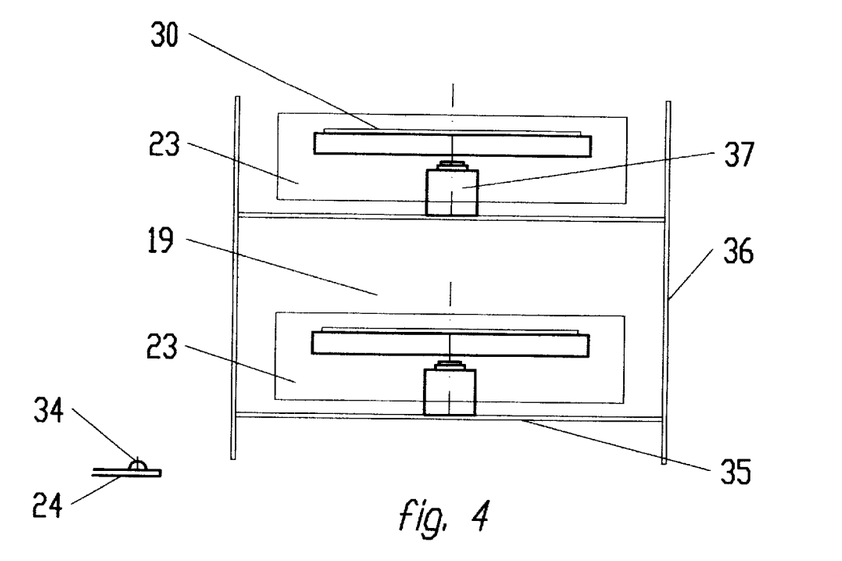
FIG. 4 is a side view of several representative crankshaft arms positioned below open disc recording drive bays.
Figure 5:
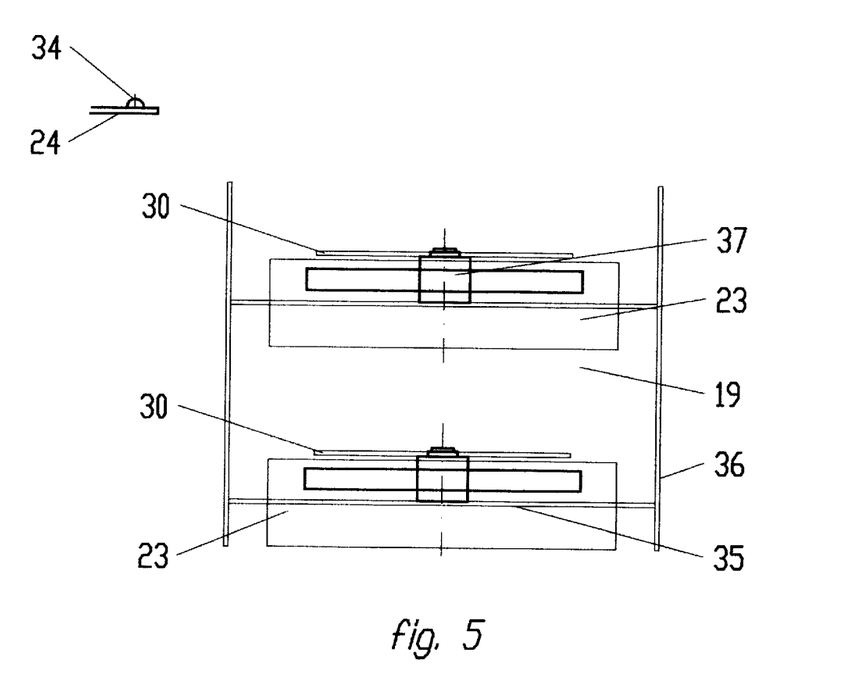
FIG. 5 is a side view of several representative crankshaft arms positioned to lift recorded discs from open disc recording drive bays and the edge of representative platters.

As depicted in FIGS. 4 and 5, the cabinet or vertical housing 19 for the disc drives or CDR units 23 has a plurality of uniform, articulate arms 35 which are attached to and controlled by a vertically adjustable crankshaft 36. The plurality of uniform arms 35 are perpendicularly attached to the crankshaft 36 at predetermined equal distances between arms. Attachment of the arms to the crankshaft may be by weldment or nut and bolt assembly, depending on the materials of construction. The arms of the crankshaft may be constructed from durable, high impact poly-carbon material or aluminum to minimize weight and load upon the drive shaft and motor. Each uniform arm comprises a top surface with a raised, stopper 37 centrally positioned thereon. Each stopper 37 top is tapered from top to bottom and sized to engage a disc by the disc center hole. Each stopper 37 is of a uniform height and diameter sufficiently sized to access a disc 30 loaded onto a platter bay 24 through an open recording drive or CDR unit bay 23. The stoppers 37 may be constructed from a variety of lightweight, solid materials with high resistance to wear. Once engaged by a stopper 37, the disc 30 is lifted by positive vertical movement of the uniform arm 35 as shown in FIG. 5. Movement of the crankshaft 36 is electro-mechanically controlled along its longitudinal axis by a stepper motor and actuator housed in the framework base. The stepper motor and actuator are controlled by the host computer or other microprocessor based controller using well known programming techniques. Operation of the crankshaft 36 allows loading or unloading of the horizontal platters 24 and the disc drive or CDR unit bays 23.

As shown in FIG. 1, the framework base 17 also supports and includes a rotatable arm 18 which houses a compact disc picker assembly 38. The picker assembly 38 is positioned along the vertical axis of the rotatable arm 18, and said picker assembly 38 moves vertically up and down said rotatable arm 18. In the preferred embodiment of the present invention, the rotatable arm 18 rotates freely up to 300 degrees along its vertical axis. The rotational movement of the arm 18 is controlled by a stepper motor and actuator housed in the framework base. The vertical movement of the disc picker assembly 38 within the arm 18 is controlled by a separate stepper motor, photo eye, and actuator within the rotatable arm. Both stepper motors and actuators and the photo eye of the rotatable arm are controlled by the host computer or other microprocessor based controller using well known programming techniques. The photo eye of the disc picker detects disc height position and provides this control input to the controller. Disc picker assembly mechanisms are well known in the art. The preferred embodiment of the present invention uses the disc picker assembly apparatus disclosed in my prior invention, U.S. Pat. No. 5,873,692. By addition of components to the preferred embodiment, the rotatable arm 18 and picker assembly can be used to transport blank compact discs from a bulk supply hopper to the disc stack modules 21 and to transport recorded discs from stack modules 21 to labeling components or a bulk recorded disc hopper.

It is also conceivable that the degree of rotation for the rotatable arm 18 along its vertical axis can vary according to the principles herein depending upon the spatial limitations and number of disc stack modules 21 of each system.

As shown in FIG. 1, the framework base 17 of the depicted embodiment of the present invention also includes and supports disc stack modules 21 disposed in an arcuate arrangement and configured semi-circularly around the rotatable arm 18. The preferred embodiment of the present invention includes four such stack modules 21 and also includes and one disc spindle, not shown in FIG. 1, also disposed in an arcuate arrangement and configured within the same semi-circular arc around the rotatable arm 18. For the preferred embodiment of the present invention, the disc spindle is located closest towards the drive shaft and platters, with the stack modules 21 spaced equidistant around the rotatable arm within a 270 degree arc. The disc spindle includes a vertical post affixed to the framework base, for example by nut and bolt, wherein the post diameter is slightly smaller than the disc hub center hole. Each stack module 21 includes three vertical posts affixed to the framework base, for example by nut and bolt. Each of the posts are vertically oriented and spaced apart from each other. The spacing and orientation of the vertical posts for each stack module 21 are such that an equilateral triangle is formed by the three posts with space within the posts to just accommodate the diameter of a compact disc when the center of the disc is aligned with the center point of the equilateral triangle. In the preferred embodiment of the present invention, the disc spindle and stack module posts heights are 18 inches each. In the preferred embodiment of the present invention, the four stack modules are initially loaded with 250 blank discs each. As the recording process continues, the finished, recorded discs are first loaded by the disc picker module 38 from the platter bays 29 onto the spindle. Once a blank disc stack module 21 is completely empty, the space provided therein is used to store additional finished, recorded discs. Thus when the recording process is completed, the spindle and three stack modules each contain 250 finished, recorded discs.

The operation of the apparatus for simultaneous loading a plurality of discs into a plurality of disc recording drives, wherein each disc has a hub defining a center hole such that the center hole in a stack of said discs define a central cylindrical bore having a longitudinal axis, is now described. The logic necessary to control the steps for the simultaneous automatic loading tower apparatus operation as depicted in FIG. 7a–7d is programmed into the microprocessor located in the tower base and into the computer software on the external host computer.

Figure 7A:
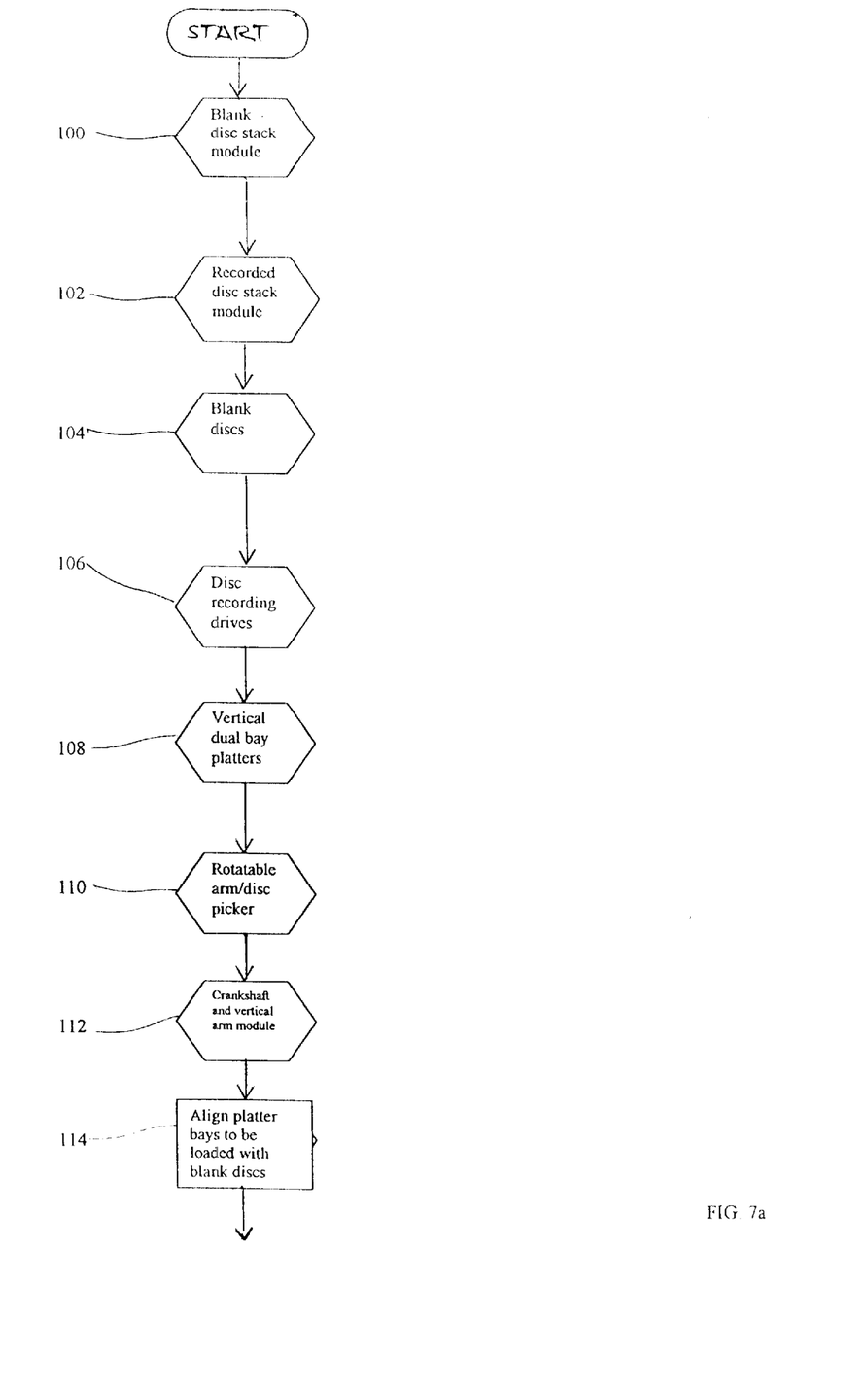

In step 100, the method for using the apparatus for simultaneous loading a plurality of discs 30 into a plurality of disc recording drives 23 begins by providing at least one blank disc stack module 21 having at least one vertical support for a plurality of blank discs. In the preferred embodiment of the apparatus for the present invention, four blank disc stack modules 21 are loaded with approximately 250 blank discs per module. As the method continues through loading and unloading the recording or CDR unit drives, the blank disc stack modules 21 empty and become converted to recorded disc stack modules.

Step 102 in this operation is providing at least one recorded disc stack module having at least one vertical support for a plurality of recorded discs. In the preferred embodiment of the apparatus for the present invention, one recorded disc stack module is initially available with capacity for approximately 250 recorded discs. As the method continues through repeated loading and unloading of the recording drives, the blank disc stack modules 21 empty and become available to be used as recorded disc stack modules.

In step 104, operation is furthered by providing a plurality of blank discs 30 in each said blank disc stack module 21. In the preferred embodiment of the present invention, 250 blank discs are initially loaded into each of four blank disc stack modules 21.

In step 106, operation is furthered by providing a plurality of vertically stacked, uniform disc recording drives or CDR units 23. In the preferred embodiment of the apparatus for the present invention, eight such disc or CDR unit drives are provided.

In step 108, operation is furthered by providing a plurality of vertically stacked, uniform platters 24 perpendicularly connected to a vertical support member 25, with a controlled horizontal range of motion around the central axis of said vertical support member 26, each platter further comprising dual, uniform disc bays 29. In the preferred embodiment of the apparatus for the present invention, eight such platters are provided.

In step 110, operation is furthered by providing a rotatable arm 18 which houses a disc picker module 38 with a controlled range of motion among said blank disc stack modules 21, recorded disc stack modules, and said platters 29. In the preferred embodiment of the apparatus for the present invention, said disc picker module is applicant's invention described in U.S. Pat. No. 5,873,692.

In step 112, operation is furthered by providing a crankshaft module 36 to control the vertical movement of a plurality of uniform arms 35, each said arm comprising a stopper 37 with its top tapered from top to bottom and sized to fit into said disc center hole and thus engage said disc 30.

In step 114, operation is furthered by controlling said platter movement so that a plurality of empty platter bays 29 are aligned to be loaded with blank discs 30.

In step 116, operation is furthered by controlling said disc picker module 38 to load one blank disc into each empty aligned platter bay 29 from a blank disc stack module 21.

In step 118, once each aligned platter bay 29 has been loaded with one blank disc 30, operation is furthered by controlling said disc recording drive or CDR unit bays 23 to simultaneously open.

Figure 7B:
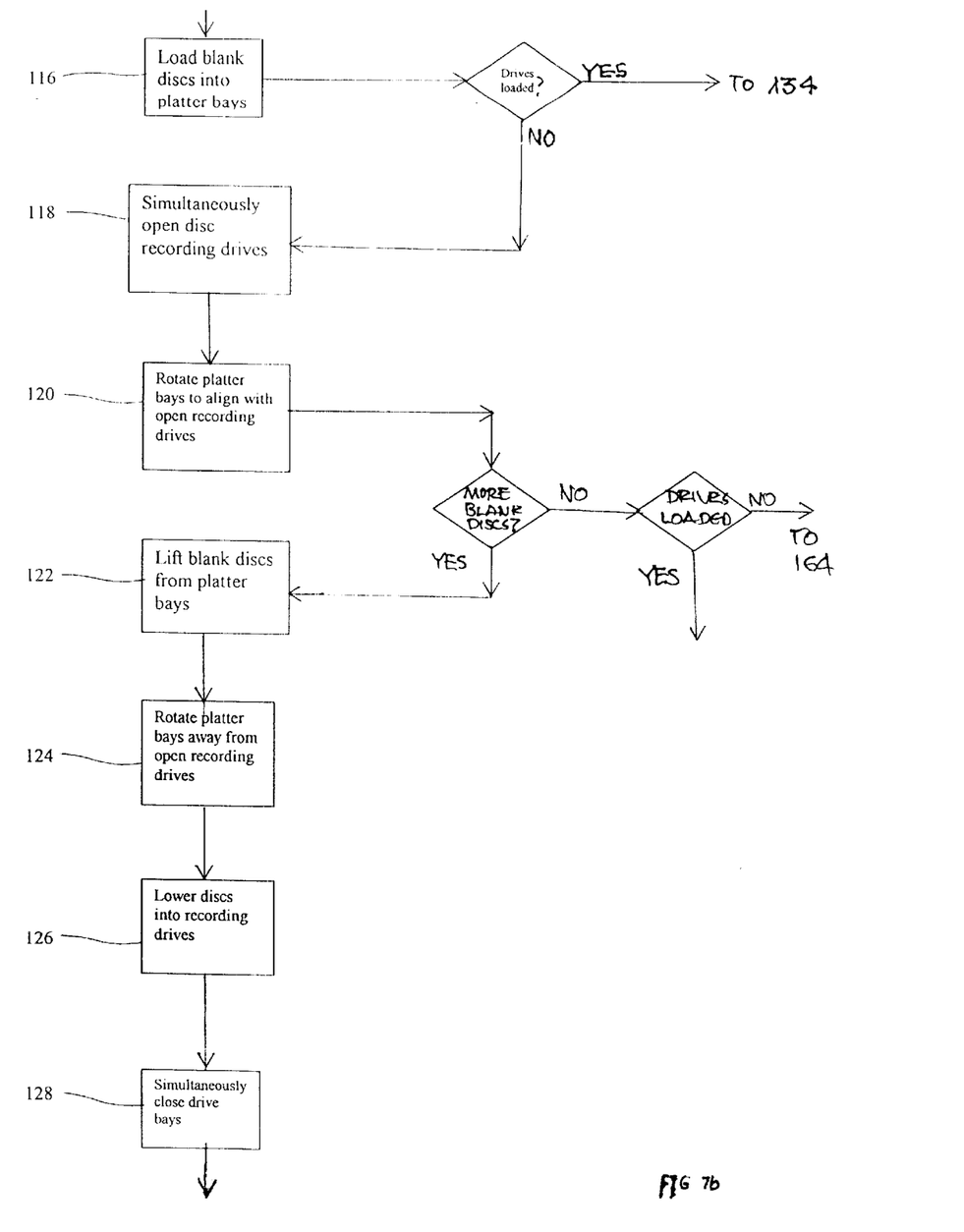

In step 120, once said bays 23 are open, operation is furthered by controlling said platter bays 29 to rotate horizontally to a position wherein the center of said blank discs are positioned directly over the center of said open disc recording drive or CDR unit bays 23.

In step 122, once the blank discs loaded into said platter bays 29 are positioned directly over the center of said open disc recording drive or CDR unit bays 23, operation is furthered by controlling said crankshaft module 36 to simultaneously engage the plurality of blank discs 30 in said platter bays 29 and lift said blank discs 30 from said platter bays 29.

In step 124, once the plurality of blank discs 30 in said platter bays 29 have been lifted from said platter bays 29 and are held by said crankshaft module 36, operation is furthered by controlling said platter bays 29 to rotate horizontally away from said open disc recording drives or CDR units 23.

In step 126, after said platter bays 29 have been rotated horizontally away from said open disc recording drives or CDR units 23, operation is furthered by controlling said crankshaft module 36 to simultaneously lower the plurality of blank discs 30 into said disc recording or CDR unit drives 23 and to then simultaneously disengage from said blank discs 30.

In step 128, after the blank discs 30 have been lowered into said disc recording or CDR unit drives 23 and the crankshaft module 36 has disengaged from said blank discs 30, operation is furthered by simultaneously closing said plurality of disc recording or CDR unit drives 23.

In step 130, once the disc or CDR unit drives 23 are closed with the blank discs 30 now in place for receiving digital data, operation is furthered by recording digital media onto said plurality of loaded discs.

In step 132, while the disc are receiving digital data, operation is furthered by repeating the loading steps of this method for a plurality of blank discs into said platter bays 29.

In step 134, operation is furthered by completing the recording of digital data onto the plurality of discs loaded into the disc or CDR unit drives 23.

Figure 7C:
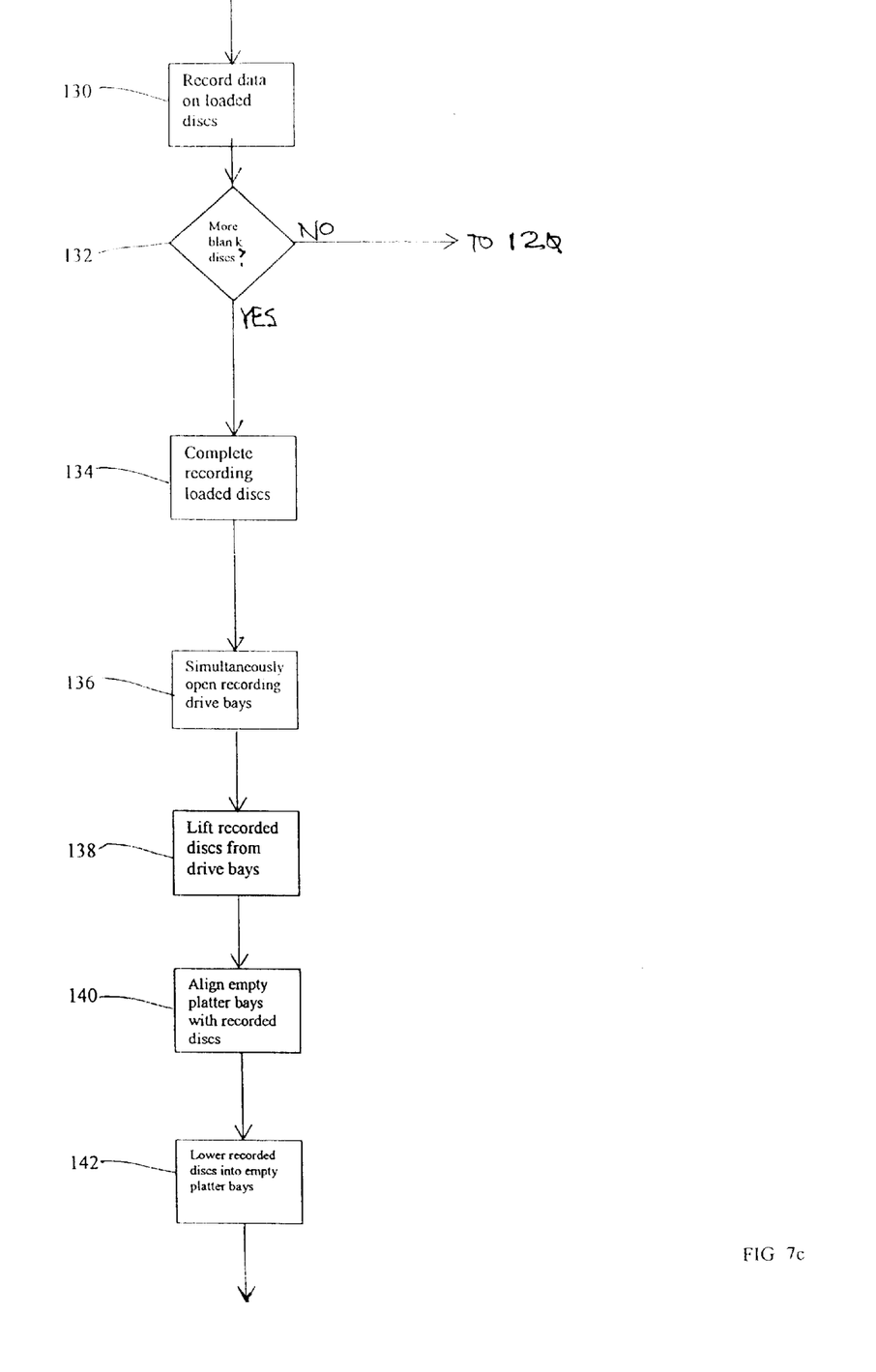

In step 136, once all digital data has been recorded onto the discs loaded into the discs drives 23, operation is furthered by controlling said disc recording drive or CDR unit bays 23 containing the recorded discs to simultaneously open.

In step 138, after the disc or CDR unit drives 23 are completely open, operation is furthered by controlling said crankshaft module 36 to simultaneously engage the plurality of recorded discs in said recording drive or CDR unit bays 23 and lift said recorded discs from said recording drive or CDR unit bays.

In step 140, after the recorded discs have been lifted from said recording drive or CDR unit bays 23, operation is furthered by controlling said empty platter bays 29 to rotate horizontally to a position directly under said recorded discs held by said crankshaft module 36 wherein the center 33 of each said empty platter bay 29 is aligned with the center of each said recorded disc.

In step 142, once the empty platter centers 33 and recorded disc centers are so aligned, operation is furthered by controlling said crankshaft module 36 to simultaneously lower the plurality of recorded discs into said empty platter bays 29 and to then simultaneously disengage from said recorded discs.

In step 144, once all recorded discs are residing in said platter bays 29, operation is furthered by controlling said platter bays to rotate horizontally to a position wherein the center of said blank discs 30 are positioned directly over the center of said open disc recording drive or CDR unit bays 23.

In step 146, once the blank disc centers and disc recording drive or CDR unit bay centers 23 are so aligned, operation is furthered by controlling said crankshaft module 36 to simultaneously engage the plurality of blank discs 30 in said platter bays 29 and lift said blank discs 30 from said platter bays 29.

Figure 7D:
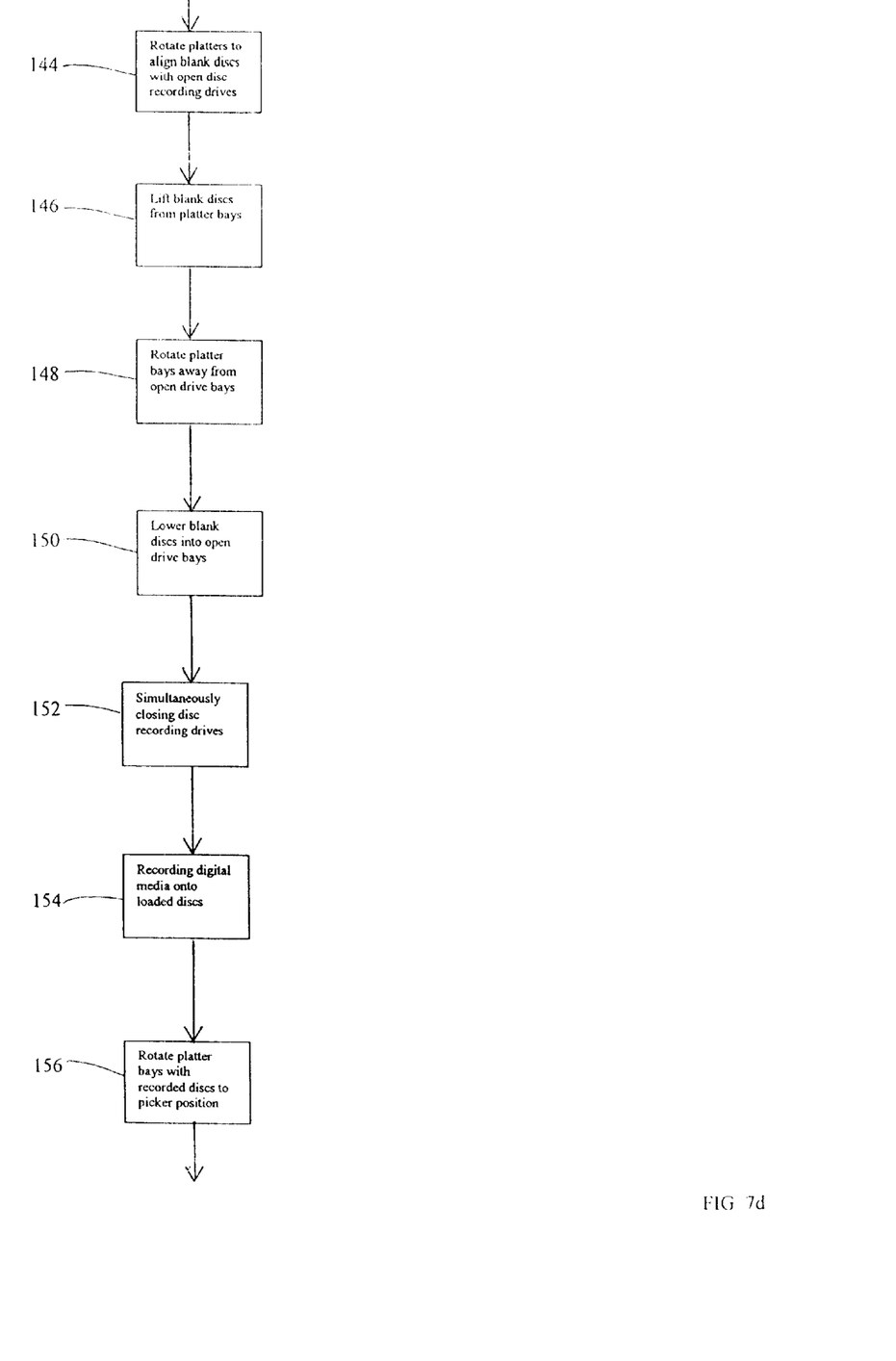

In step 148, once the blank discs 30 have been so lifted from said platter bays 29, operation is furthered by controlling said platter bays 29 to rotate horizontally away from said open disc recording or CDR unit drives 23.

In step 150, after the bays 29 have been rotated away from said open disc recording or CDR unit drives 23, operation is furthered by controlling said crankshaft module 36 to simultaneously lower the plurality of blank discs 30 into said 20 disc recording or CDR unit drives 23 and to then simultaneously disengage from said blank discs.

In step 152, once the recording drive or CDR unit bays 23 are thus loaded, operation is furthered by simultaneously closing said plurality of disc recording or CDR unit drives 23.

In step 154, once the disc or CDR unit drives 23 are closed with the blank discs 30 now in place for receiving digital data, operation is furthered by recording digital media onto said plurality of loaded discs.

In step 156, after recording digital media onto said loaded discs has begun, operation is furthered by controlling said platter bays containing the recorded discs to rotate horizontally to a position wherein said recorded discs are accessible by said disc picker module 38.

In step 158, once the recorded discs have been rotated horizontally to the desired position for access by the disc picker module 38, operation is furthered by controlling said disc picker module 38 to unload each platter bay 29 containing a recorded disc into said recorded disc stack module.

Figure 7E:
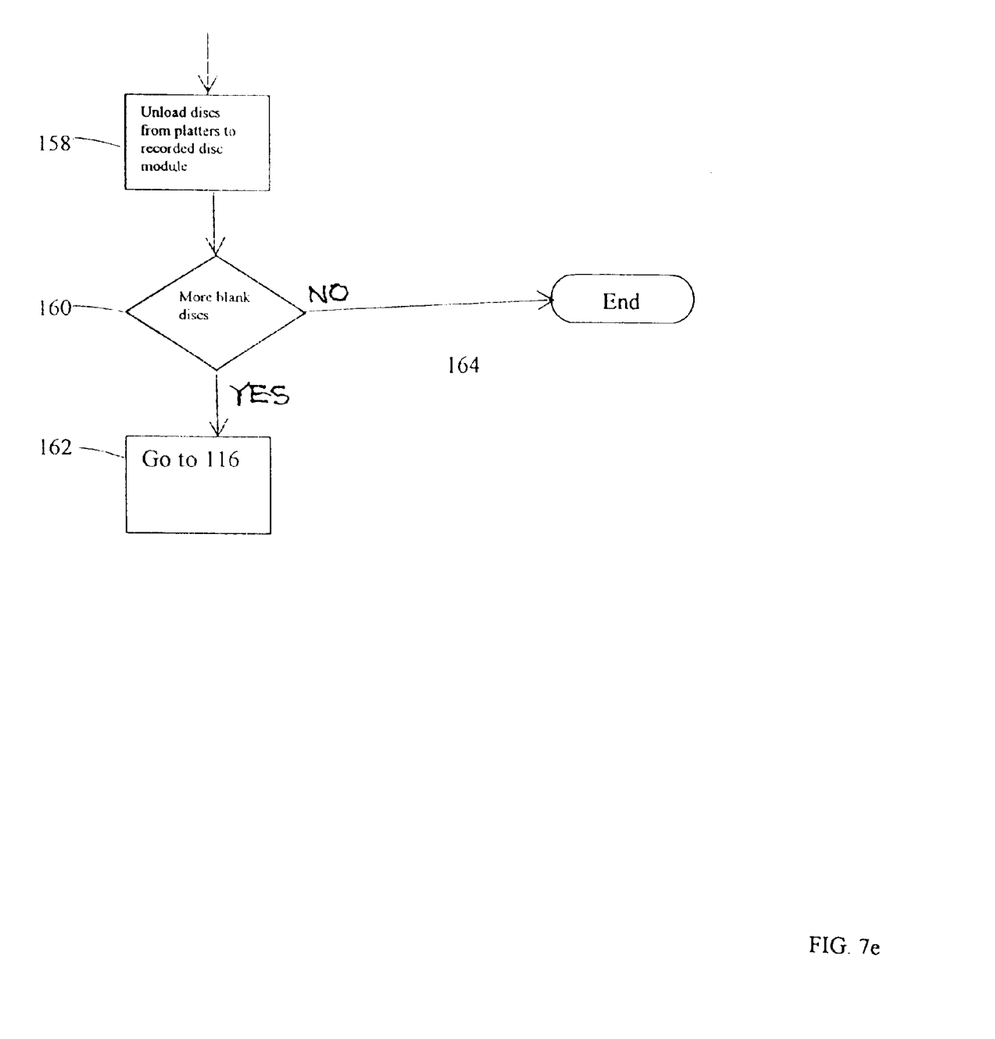

In step 160, operation is furthered by repeating the loading steps of this method for a plurality of blank discs into said platter bays during the recording phase for a plurality of discs.

In step 162, operation is furthered by repeating the unloading and loading steps of said disc recording or CDR unit drives 23 of this method until the desired number of discs have been recorded.

In step 164, once the desired number of discs have been recorded, the method is terminated.

It should be noted that this operational routine is run iteratively, and that additional positions may be defined, for example by including more than one tower of drives or CDR units 23, or, if additional serviced modules are interconnected, by using one rotatable picker assembly module 38 and one rotatable vertical tray assembly to service any additional tower modules 23 or stacked disc modules 21. Steps 138 through 154 are thereby exemplary for a desired embodiment of the present apparatus and may be repeated for different apparatus embodiments by modifying the method sequence accordingly.

It should be understood that the invention is not intended to be limited by the specifics of the above-described embodiments, but rather by the accompanying claims.

I claim:

1. An apparatus for simultaneous automatic loading of discs into multiple disc recording drives, comprising:
    a supporting framework, further comprising a base with platform and at least one tower disposed on said platform, wherein each said tower has an operational face;
    a plurality of disc drives, each having a horizontally positioned drive bay wherein each such bay has a center, and wherein said disc drives are vertically aligned within said tower face so that said disc drive bays when simultaneously opened project outward from said tower operational face;
    a first activator means within said supporting framework to synchronize simultaneous alignment of said disc drive bay centers;
    a pivotal transport tower means upon said platform for picking up and transporting at least a single disc within the apparatus framework;
    a plurality of disc storage modules vertically positioned upon said platform in a symmetric circular arrangement around said pivotal transport tower means;
    a plurality of uniform discs vertically stacked in said disc storage modules, wherein each disc has a hub defining a center hole;
    a rotatable delivery means within said supporting framework to simultaneously position a plurality of disc center holes in alignment with said open drive bay centers;
    an articulate arm means within said tower operational face to simultaneously transfer discs between said rotatable delivery means and said drive bays;
    a second activator means within said supporting framework to coordinate the movements of said articulate arm means; and
    computer processing memory means whereby said first and second activator means and disc drives are interconnected, coordinated, and controlled, and whereby source digital information to be copied is contained and controlled.

2. The apparatus of claim 1, wherein said rotatable delivery means further comprises:
    a vertical drive shaft having a top end and a bottom end;
    said drive shaft top end and bottom end rotatably connected to said supporting framework;
    a plurality of uniform, horizontal platters perpendicularly attached to said drive shaft at predetermined equal distances between said platters wherein each said platter has a central vertical axis, a top side, and a bottom side, and further comprises a point of attachment to said shaft along said platter central vertical axis, and dual disc bays equally sized and displaced from said platter cental axis to receive discs from said platter top side, wherein each said disc bay further comprises a front edge, a back edge and a central core wherein said front disc bay edge is open and said central core is accessible from said platter top side, said platter bottom side, and disc bay front edge; and
    means for controlling the rotation of said shaft along said shaft vertical axis and the horizontal movement of said platters and alignment of said central cores thereof with said drive bay centers.

3. The apparatus of claim 2, wherein said articulate arm means further comprises:
    a vertically adjustable crankshaft;
    a plurality of uniform arms perpendicularly attached to said crankshaft at predetermined equal distances between arms, wherein each said arm further comprises a top surface and a raised, tapered stopper positioned on said top surface wherein each said tapered stopper is tapered from top to bottom and sized to engage into said disc center hole through said drive bay center and said platter central core, and move said disc in accordance with the vertical movement of said arm; and
    means for controlling relative movement of said crankshaft along its longitudinal axis.

4. The apparatus of claim 3, wherein said pivotal transport tower means further comprises:
    a vertical axis perpendicular to said platform;
    a means for transport tower axial rotation about said transport tower vertical axis;
    a disc picker means for picking up and transporting at least a single disc within said rotatable delivery means and said disc storage modules, said disc picker capable of controlled vertical position along said pivotal transport tower;
    an activator means within said pivotal transport tower to coordinate the rotation of said transport tower and said disc picker vertical position and operation; and
    computer processing memory means to interconnect, coordinate, and control said pivotal tower transport means.

5. The apparatus of claim 4, wherein said discs are recordable digital compact discs and said disc drives are recordable digital compact disc writers.

6. The apparatus of claim 4, wherein said discs are recordable digital compact video discs and said disc drives are recordable digital compact video disc writers.

7. An apparatus for simultaneous automatic handling of discs, comprising:
- means for simultaneous transfer of a plurality of discs in a horizontal plane;
- means for simultaneous transfer of a plurality of discs in a vertical plane;
- means for stacking at least one stack of discs; and
- means for transferring discs between said means for simultaneous transfer of a plurality of discs in a horizontal plane and means for stacking discs.

8. The apparatus of claim 7, wherein said means for simultaneous transfer of a plurality of discs in a horizontal plane further comprises:
- a vertical drive shaft having a top end and a bottom end;
- said drive shaft top end and bottom end rotatably connected to supporting framework;
- a plurality of uniform, horizontal platters perpendicularly attached to said drive shaft at predetermined equal distances between said platters wherein each said platter has a central vertical axis, a top side, and a bottom side, and further comprises a point of attachment to said shaft along said platter central vertical axis, and dual disc bays equally sized and displaced from said platter cental axis to receive discs from said platter top side, wherein each said disc bay further comprises a front edge, a back edge and a central core wherein said front disc bay edge is open and said central core is accessible from said platter top side, said platter bottom side, and disc bay front edge; and
- means for controlling the rotation of said shaft along said shaft vertical axis and the horizontal movement of said platters and alignment of said central cores thereof with disc center holes.

9. The apparatus of claim 8, wherein said means for simultaneous transfer of a plurality of discs in a vertical plane further comprises:
- a vertically adjustable crankshaft connected to said framework;
- a plurality of uniform arms perpendicularly attached to said crankshaft at predetermined equal distances between arms, wherein each said arm further comprises a top surface and a raised, tapered stopper positioned on said top surface wherein each said tapered stopper is tapered from top to bottom and sized to engage into said disc center hole through said platter central core, and move said disc in accordance with the vertical movement of said arm; and
- means for controlling relative movement of said crankshaft along its longitudinal axis.

10. The apparatus of claim 9, wherein said means for transferring discs between said rotating platter means and stacking means further comprises:
- a transport tower connected to said framework further comprising a vertical axis;
- means for transport tower axial rotation about said transport tower vertical axis;
- means for picking up and transporting at least a single disc within said rotatable delivery means and said disc storage modules, wherein the position of said picking and transport means is adjustable along said pivotal transport tower vertical axis;
- an activator means within said pivotal transport tower to coordinate the rotation of said transport tower and said means for picking up and transporting at least one disc; and
- computer processing memory means to interconnect, coordinate, and control said pivotal tower transport means.

11. In a compact disc copying system having at least one set of multiple stacked disc copying drives, each such drive having a disc receiving unit, and at least one disc storage module for storing compact discs in a stack, a simultaneous automated disc transport mechanism comprising:
- a framework comprising a base platform;
- means for simultaneous transfer of a plurality of discs in a horizontal plane;
- means for transferring discs between said means for simultaneous transfer of a plurality of discs in a horizontal plane and disc storage modules;
- means for simultaneous transfer of a plurality of discs in a vertical plane from said means for simultaneous transfer of a plurality of discs in a horizontal plane to said disc receiving units; and
- means for computer processing memory whereby said stack disc drives, said disc storage modules, and said simultaneous automatic disc transport system are interconnected, coordinated, and controlled, and whereby source digital information to be copied is contained and controlled.

12. The simultaneous automated disc transport mechanism of claim 11 wherein said means for simultaneous transfer of a plurality of discs in a horizontal plane further comprises:
- a vertical drive shaft having a top end and a bottom end;
- said drive shaft top end and bottom end rotatably connected to said framework;
- a plurality of uniform, horizontal platters perpendicularly attached to said drive shaft at predetermined equal distances between said platters wherein each said platter has a central vertical axis, a top side, and a bottom side, and further comprises a point of attachment to said shaft along said platter central vertical axis, and dual disc bays equally sized and displaced from said platter cental axis to receive discs from said platter top side, wherein each said disc bay further comprises a front edge, a back edge and a central core wherein said front disc bay edge is open and said central core is accessible from said platter top side, said platter bottom side, and disc bay front edge; and
- means for controlling the rotation of said shaft along said shaft vertical axis and the horizontal movement of said platters and alignment of said central cores thereof with disc center holes.

13. The simultaneous automated disc transport mechanism of claim 12 wherein said means for simultaneous transfer of a plurality of discs from said means for simultaneous transfer of a plurality of discs in a horizontal plane to said disc receiving units further comprises:
- a vertically adjustable crankshaft connected to said framework;
- a plurality of uniform arms perpendicularly attached to said crankshaft at predetermined equal distances between arms, wherein each said arm further comprises a top surface and a raised, tapered stopper positioned on said top surface wherein each said tapered stopper is tapered from top to bottom and sized to engage into said disc center hole through said platter central core, and move said disc in accordance with the vertical movement of said arm; and
- means for controlling relative movement of said crankshaft along its longitudinal axis.

14. The simultaneous automated disc transport mechanism of claim 13 wherein said means for transferring discs between said means for simultaneous transfer of a plurality of discs in a horizontal plane and disc storage modules further comprises:

a transport tower connected to said framework further comprising a vertical axis;

means for transport tower axial rotation about said transport tower vertical axis;

means for picking up and transporting at least a single disc within said rotatable delivery means and said disc storage modules, wherein the position of said picking and transport means is adjustable along said pivotal transport tower vertical axis;

an activator means within said pivotal transport tower to coordinate the rotation of said transport tower and said means for picking up and transporting at least one disc; and computer processing memory means to interconnect, coordinate, and control said pivotal tower transport means.

15. A method for simultaneous loading a plurality of discs into a plurality of disc recording drives, wherein each disc has a hub defining a center hole such that the center hole in a stack of said discs define a central cylindrical bore having a longitudinal axis, comprising:

providing at least one blank disc stack module having at least one vertical support for a plurality of blank discs;

providing at least one recorded disc stack module having at least one vertical support for a plurality of recorded discs;

providing a plurality of blank discs in said blank disc stack module;

providing a plurality of vertically stacked, uniform disc recording drives;

providing a plurality of vertically stacked, uniform platters perpendicularly connected to a vertical support member, with a controlled horizontal range of motion around the central axis of said vertical support member, each platter further comprising dual, uniform disc bays;

providing a disc picker module with a controlled range of motion among said blank disc stack module, recorded disc stack module, and said platters;

providing a crankshaft module to control the vertical movement of a plurality of uniform, arms, each said arm comprising a stopper tapered from the top and sized to fit into said disc center hole and thus engage said disc;

controlling said platter movement so that a plurality of empty platter bays are aligned to be loaded with blank discs;

controlling said disc picker module to load one disc into each empty aligned platter bay from said blank disc stack module;

controlling said disc recording drive bays to simultaneously open;

controlling said platter bays to rotate horizontally to a position wherein the center of said blank discs are positioned directly over the center of said open disc recording drive bays;

controlling said crankshaft module to simultaneously engage the plurality of blank discs in said platter bays and lift said blank discs from said platter bays;

controlling said platter bays to rotate horizontally away from said open disc recording drives;

controlling said crankshaft module to simultaneously lower the plurality of blank discs into said disc recording drives and to then simultaneously disengage from said blank discs;

simultaneously closing said plurality of disc recording drives;

recording digital media onto said plurality of loaded discs;

repeating the loading steps of this method for a plurality of blank discs into said platter bays during the recording phase for a plurality of discs;

completing the recording onto the plurality of discs loaded into the disc drives;

controlling said disc recording drive bays containing the recorded discs to simultaneously open;

controlling said crankshaft module to simultaneously engage the plurality of recorded discs in said recording drive bays and lift said blank discs from said recording drive bays;

controlling said empty platter bays to rotate horizontally to a position directly under said recorded discs held by said crankshaft module wherein the center of each said empty platter bay is aligned with the center of each said recorded disc;

controlling said crankshaft module to simultaneously lower the plurality of recorded discs into said empty platter bays and to then simultaneously disengage from said recorded discs;

controlling said platter bays to rotate horizontally to a position wherein the center of said blank discs are positioned directly over the center of said open disc recording drive bays;

controlling said crankshaft module to simultaneously engage the plurality of blank discs in said platter bays and lift said blank discs from said platter bays;

controlling said platter bays to rotate horizontally away from said open disc recording drives;

controlling said crankshaft module to simultaneously lower the plurality of blank discs into said disc recording drives and to then simultaneously disengage from said blank discs;

simultaneously closing said plurality of disc recording drives;

recording digital media onto said plurality of loaded discs;

controlling said platter bays containing the recorded discs to rotate horizontally to a position wherein said recorded discs are accessible by said disc picker module;

controlling said disc picker module to unload each platter bay containing a recorded disc into said recorded disc stack module;

repeating the loading steps of this method for a plurality of blank discs into said platter bays during the recording phase for a plurality of discs;

repeating the unloading and loading steps of said disc recording drives of this method until the desired number of discs have been recorded; and terminating the method.

* * * * *